United States Patent
Morisawa

(10) Patent No.: US 10,834,371 B2
(45) Date of Patent: Nov. 10, 2020

(54) GENERATION APPARATUS OF VIRTUAL VIEWPOINT IMAGE, CONTROL METHOD OF APPARATUS, AND STORAGE MEDIUM

(71) Applicant: CANON KABUSHIKI KAISHA, Tokyo (JP)

(72) Inventor: Keisuke Morisawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 23 days.

(21) Appl. No.: 15/996,818

(22) Filed: Jun. 4, 2018

(65) Prior Publication Data

US 2018/0359457 A1 Dec. 13, 2018

(30) Foreign Application Priority Data

Jun. 13, 2017 (JP) .................................. 2017-115933

(51) Int. Cl.
| | | |
|---|---|---|
| *H04N 7/00* | (2011.01) | |
| *H04N 13/111* | (2018.01) | |
| *H04N 13/167* | (2018.01) | |
| *H04N 13/128* | (2018.01) | |
| *H04N 13/282* | (2018.01) | |
| *H04N 13/275* | (2018.01) | |
| *G06T 3/00* | (2006.01) | |
| *H04N 5/247* | (2006.01) | |
| *G01B 11/245* | (2006.01) | |

(52) U.S. Cl.
CPC .......... *H04N 13/111* (2018.05); *G01B 11/245* (2013.01); *G06T 3/00* (2013.01); *H04N 5/247* (2013.01); *H04N 13/128* (2018.05); *H04N 13/167* (2018.05); *H04N 13/275* (2018.05); *H04N 13/282* (2018.05)

(58) Field of Classification Search
CPC .. H04N 13/111; H04N 13/128; H04N 13/167; H04N 13/275; H04N 13/282; H04N 5/247; G01B 11/245; G06T 3/00
See application file for complete search history.

(56) References Cited

U.S. PATENT DOCUMENTS

| 2004/0150638 A1* | 8/2004 | Ikeuchi | .................. G06T 15/04 |
| | | | 345/419 |
| 2017/0142341 A1* | 5/2017 | Ikeda | .................. G06K 9/00771 |

FOREIGN PATENT DOCUMENTS

| JP | 2003115055 A | * | 4/2003 |
| JP | 2003115055 A | | 4/2003 |
| JP | 2004086508 A | | 3/2004 |

* cited by examiner

*Primary Examiner* — Peet Dhillon

(74) *Attorney, Agent, or Firm* — Rossi, Kimms & McDowell LLP

(57) ABSTRACT

A generation apparatus that generates a virtual viewpoint image based on a plurality of captured images obtained by a plurality of cameras and virtual viewpoint information, and includes: a generation unit configured to generate a virtual viewpoint image by a generation method determined from a plurality of generation methods for generating a virtual viewpoint image: a changing unit configured to change the generation method for generating a virtual viewpoint image from a first generation method to a second generation method; and a control unit configured to perform control to restrain a change of the generation method by the changing unit.

17 Claims, 8 Drawing Sheets

GENERATION APPARATUS OF VIRTUAL VIEWPOINT IMAGE, CONTROL METHOD OF APPARATUS, AND STORAGE MEDIUM

BACKGROUND OF THE INVENTION

Field of the Invention

The present invention relates to an apparatus for controlling generation of a virtual viewpoint image, a method, and a storage medium.

Description of the Related Art

In recent years, a technique is known that generates an image (free viewpoint image) reproducing a view from an arbitrary viewpoint (virtual viewpoint) based on a group of captured images obtained by installing a plurality of cameras at different positions and capturing a scene in the real space from a plurality of viewpoints in synchronization. With this free viewpoint image, for example, it is possible to view a highlight scene and the like in soccer or basketball from various angles, and therefore, compared to a normal image, it is possible to give a user a strong feeling of being at a live performance.

In rendering processing of a free viewpoint image, MBR (Model-Based Rendering) that uses a three-dimensional shape of a scene or IBR (Image-Based Rendering) that uses a group of captured images is adopted generally as a method thereof.

Here, MBR is a method for generating a view of a scene from a virtual viewpoint as an image by restoring (generating) a three-dimensional shape of a target scene. In this method, a three-dimensional shape is restored, and therefore, the degree of freedom of viewpoint is high and it is possible to generate an image whose difference from the actual view is small. However, there is a limit to restoration of a three-dimensional shape with a high accuracy and it is difficult to draw a fine surface of an object and to reproduce a concave object. Further, in the case where a plurality of complex shapes exists, the amount of calculation becomes enormous, and therefore, real-time restoration of a three-dimensional shape is difficult.

Further, IBR is a method for generating a view from a virtual viewpoint as an image by modifying and combining a group of input images obtained by capturing a target scene. With this method, it is possible to generate an image whose realism is high, which reproduces a complex shape as a texture. However, the degree of freedom of viewpoint is low and a large number of captured images are necessary to reproduce views from every viewpoint. This method does not depend on the complexity of a three-dimensional shape, and therefore, the amount of calculation is fixed.

Japanese Patent Laid-Open No. 2004-86508 has disclosed a display control method for completing processing within one frame by dynamically switching rendering methods in accordance with a situation of a computer among a plurality of rendering methods whose amounts of calculation are different. Further, Japanese Patent Laid-Open No. 2003-115055 has disclosed an image generation apparatus that dynamically switches processing contents of rendering based on the position of an object of interest in a three-dimensional virtual space.

However, in the case where the rendering methods are switched dynamically, there is a possibility that a video image lacking continuity is generated. For example, in IBR, an image is generated by perspective transformation of a captured image and in MBR, an image is generated based on a three-dimensional model, and therefore, depending on the arrangement of image capturing cameras and the shape and texture of an object, the view of an image becomes largely different for different methods and a visual difference is apt to become large. Further, for example, in a system capable of switching a plurality of MBR methods, there is a possibility that a video image lacking continuity is generated also at the time of switching the method from the first MBR to the second MBR. This is also the same with IBR and in the case where a rendering method other than MBR and IBR is used, a video image may lack continuity by switching of methods.

SUMMARY OF THE INVENTION

The generation apparatus according to the present invention is a generation apparatus that generates a virtual viewpoint image based on a plurality of captured images obtained by a plurality of cameras and virtual viewpoint information, and includes: a generation unit configured to generate a virtual viewpoint image by a generation method determined from a plurality of generation methods for generating a virtual viewpoint image: a changing unit configured to change the generation method for generating a virtual viewpoint image from a first generation method to a second generation method; and a control unit configured to perform control to restrain a change of the generation method by the changing unit.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention.

First Embodiment

In a first embodiment, in the case where the degree of a change in image quality in response to switching rendering methods (generation methods of virtual viewpoint image) satisfies a predetermined condition, a reduction in video image quality due to switching of the rendering methods is suppressed by restraining switching of the rendering methods. The degree of a change in image quality will be described in detail in FIG. 4A, FIG. 4B, and FIG. 4C.
(System Block)

Figure 1:
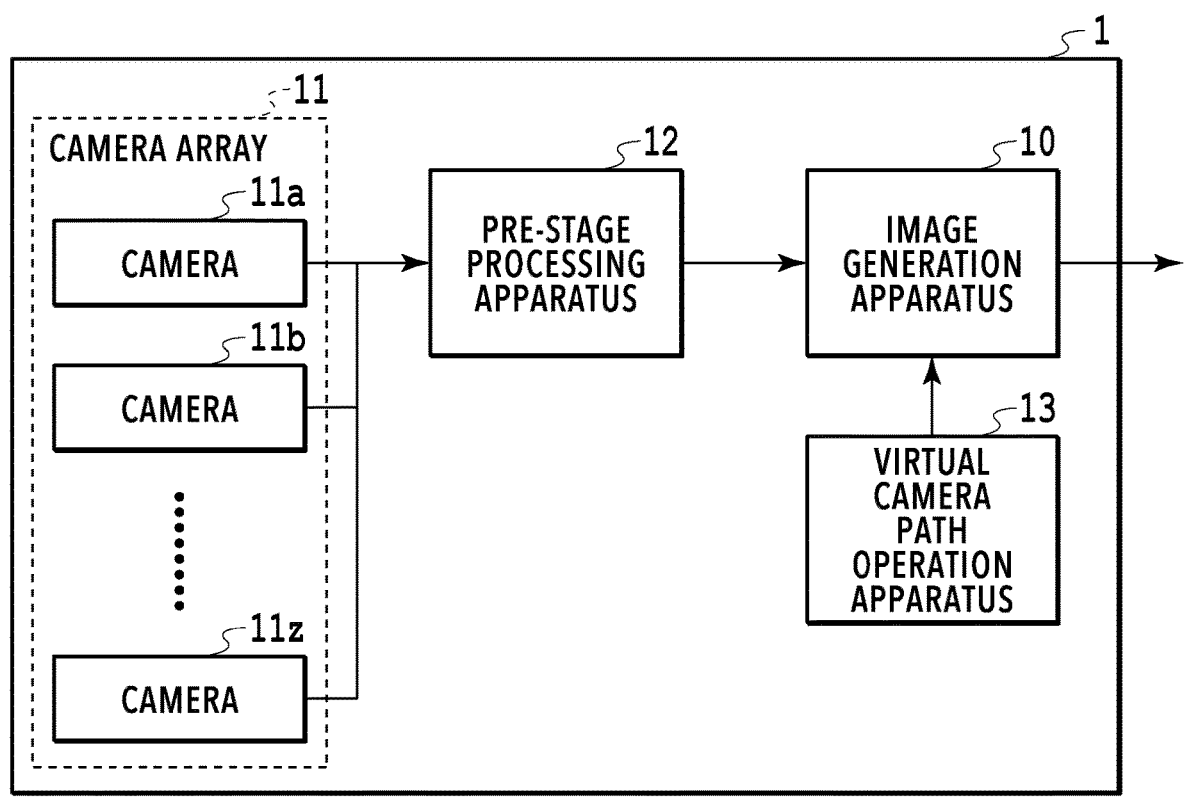
FIG. 1 is a block diagram showing a configuration of a free viewpoint image generation system including an image generation apparatus according to a first embodiment.

FIG. 1 is a block diagram showing a configuration of a free viewpoint image generation system 1 including an image generation apparatus according to the first embodiment. The free viewpoint image generation system 1 includes a camera array 11 having a plurality of cameras 11a to 11z, a pre-stage processing apparatus 12, an image generation apparatus 10, and a virtual camera path operation apparatus 13. The camera array 11 includes the plurality of cameras 11a to 11z and is an image capturing apparatus group that captures an object from various angles and outputs the captured images to the pre-stage processing apparatus 12. In the present embodiment, the camera 11a to camera 11z and the pre-stage processing apparatus 12 are connected in star topology, but they may be connected in ring topology, bus topology, and so on by daisy chain connection. The free viewpoint image is also referred to as a virtual viewpoint image. The virtual viewpoint image (free viewpoint image) is an image generated based on captured images captured by a plurality of cameras and virtual viewpoint information (including information on the position and attitude of virtual camera).

The pre-stage processing apparatus 12 performs calibration to estimate the position and attitude of each camera and foreground and background separation based on an image group output from the camera array 11 and camera information and outputs camera parameters, a foreground image, and a background image to the image generation apparatus 10. Calibration refers to processing to find camera parameters of each camera by using the captured image of each camera. In addition, the camera parameters are information including camera-specific internal parameters (for example, focal length, image center, lens distortion parameter, and so on) and external parameters indicating the position and attitude of a camera (for example, rotation matrix, position vector, and so on). Further, the foreground and background separation is processing to extract a foreground image and a background image based on a difference between a captured image and an image in which no foreground is captured. For example, in the case where an image obtained by capturing a match of soccer in a stadium is taken as an example, a player, a ball, and a goal are separated as foreground images, and a field and a spectator stand are separated as background images.

The image generation apparatus 10 receives camera parameters and a foreground image and background image group from the pre-stage processing apparatus 12, and further receives a virtual camera path from the virtual camera path operation apparatus 13, and generates and outputs a free viewpoint image by a set rendering method. The virtual camera path is information indicating the position, the attitude, the zoom value, and so on for each frame of the virtual camera. Further, the virtual camera is a virtual came capable of performing image capturing from any viewpoint different from that of any of the installed camera 11a to camera 11z. That is, the free viewpoint image generated in the free viewpoint image generation system 1 is a captured image by the virtual camera. In addition, rendering is generating images, video images, and voices from abstract, high-level information by using a predetermined algorithm. In the present embodiment, generating a free viewpoint image from camera parameters, a virtual camera path, and foreground and background images corresponds to rendering.

The virtual camera path operation apparatus 13 is a scan apparatus (input apparatus), such as a joystick, a jog dial, a touch panel, a keyboard, and a mouse, for an operator to generate a desired free viewpoint image. An operator generates a virtual camera path by using the virtual camera path operation apparatus 13 and outputs the path to the image generation apparatus 10. The operation contents of an operator include, for example, changing (moving) the position of the virtual camera, changing (rotating) the attitude, changing the zoom magnification, and so on.
(Function Block Diagram)

Figure 2:
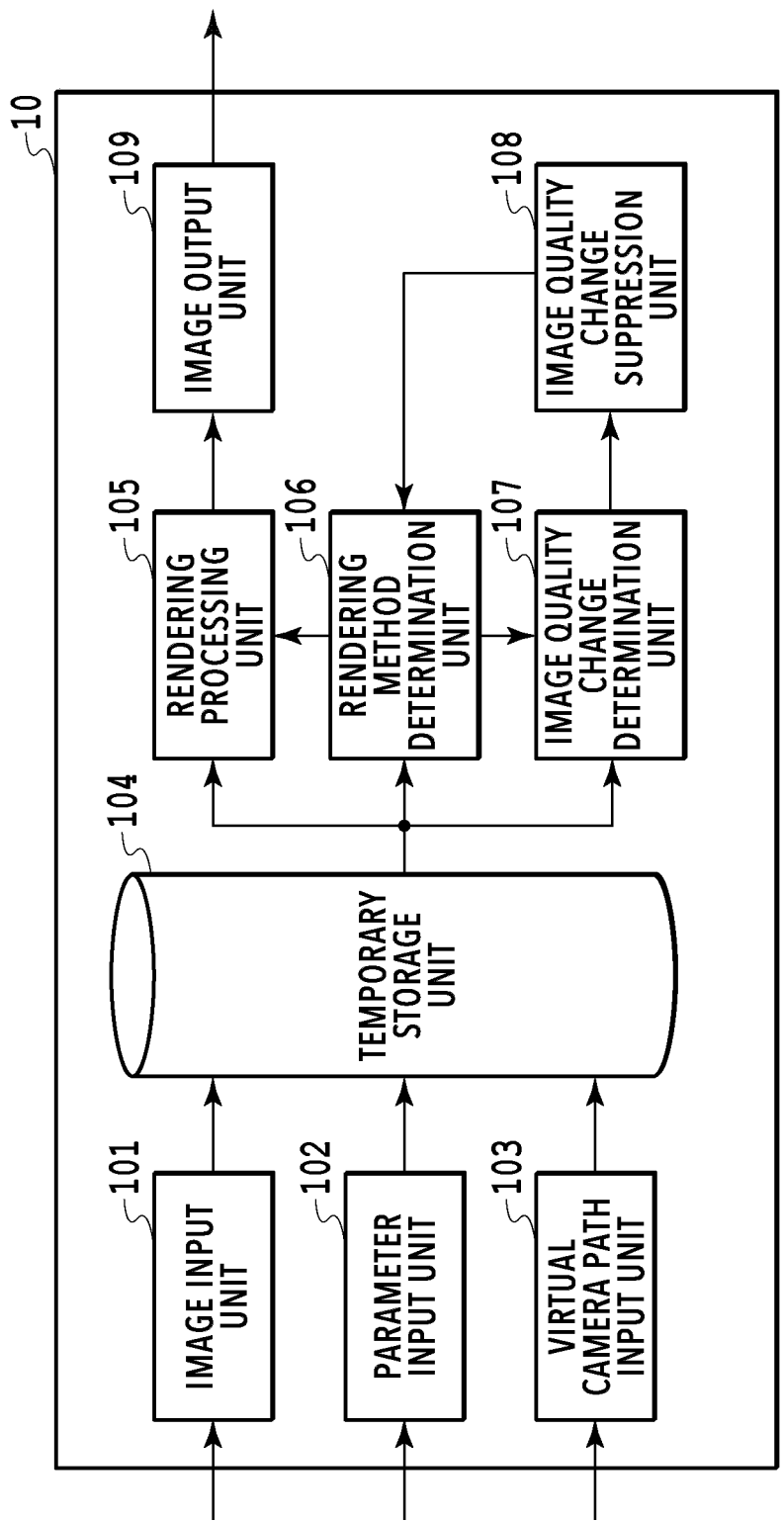
FIG. 2 is a function block diagram showing a function configuration of the image generation apparatus according to the first embodiment.

FIG. 2 is a function block diagram showing a function configuration of the image generation apparatus 10 according to the first embodiment. An image input unit 101 receives foreground images and background images of images captured by the camera 11a to the camera 11z. A parameter input unit 102 receives camera parameters calculated by the pre-stage processing apparatus 12 and indicating camera-specific information on and the position and attitude of each of the camera 11a to camera 11z. A virtual camera path input unit 103 receives a virtual camera path generated by an operator operating in the virtual camera path operation apparatus 13.

A temporary storage unit 104 temporarily stores the received image group, camera parameters, and virtual camera path. The image group, the camera parameters, and the virtual camera path stored in the temporary storage unit 104 are updated for each frame. A rendering processing unit 105 generates a free viewpoint image in accordance with the image group, the camera parameters, and the virtual camera path stored in the temporary storage unit 104 and the rendering method determined by a rendering method determination unit 106.

In the case where the rendering method is IBR, first, the rendering processing unit 105 calculates the three-dimensional position of a foreground object from a plurality of foreground images and the camera parameters stored in the temporary storage unit 104. Here, from the foreground objects captured by a plurality of cameras, a feature point is extracted and from the position relationship between the physical position of each image capturing camera and the feature point within the captured image, the position of the object is calculated. Then, by performing perspective transformation (transformation processing) for the foreground image captured from the position nearest to the virtual camera so that the view of the foreground image becomes that viewed from the position of the virtual camera, and by attaching the foreground image to the calculated position of the foreground object, a free viewpoint image is generated. It is not necessarily required to use the foreground image captured from the nearest position. For example, in the case where an occlusion has occurred, there may be a case where a free viewpoint image is generated by performing perspective transformation for the foreground image captured from another position.

Further, in the present embodiment, a free viewpoint image is generated by calculating the position of the foreground object and performing perspective transformation for the foreground image, but it may also be possible to generate an image by calculating corresponding points between a plurality of foreground images and combining the corresponding points between two images by morphing or blend. Furthermore, the three-dimensional position of the foreground object is calculated by finding the corresponding point of the foreground object, but the calculation method is not necessarily limited to this. Consequently, for example, it may also be possible to project the foreground image onto the floor surface and calculate the position of the foreground object from the center of gravity of the overlap of the foreground.

Further, in the case where the rendering method is MBR, the rendering processing unit 105 generates the three-dimensional model of a foreground object from silhouette images of a plurality of foreground images stored in the temporary storage unit 104. Then, a free viewpoint image is generated by calculating a shape so as to be a view viewed from the position of the virtual camera based on the generated three-dimensional model and coloring and attaching a texture to the three-dimensional model. In the present embodiment, a three-dimensional model is generated from silhouette images of a plurality of foreground images, but the generation method of a three-dimensional model is not necessarily limited to this. Consequently, for example, it may also be possible to generate a three-dimensional model by measuring the distance of the foreground object.

The rendering method determination unit 106 dynamically determines an optimum rendering method from the viewpoint of the image quality and processing load by using the image group, the camera parameters, the virtual camera path, and so on stored in the temporary storage unit 104 and outputs determination results to an image quality change determination unit 107. Further, in the case of receiving processing results from an image quality change suppression unit 108, the rendering method determination unit 106 determines the final rendering method and notifies the rendering processing unit 105 of the rendering method.

The image quality change determination unit 107 determines whether or not a change in image quality satisfies a predetermined condition in response to switching of the rendering methods and outputs the determination results to the image quality change suppression unit 108. The determination method of a change in image quality will be described later.

In the case where the image quality change determination unit 107 determines that there is a change in image quality that satisfies a predetermined condition, the image quality change suppression unit 108 restrains switching of the rendering methods until the position of the virtual camera becomes a position at which a change in image quality does not occur in order to suppress a change in image quality in response to switching of the rendering methods. An image output unit 109 outputs the image generated by the rendering processing unit 105 to the outside.

(Processing Flow)

Figure 3:
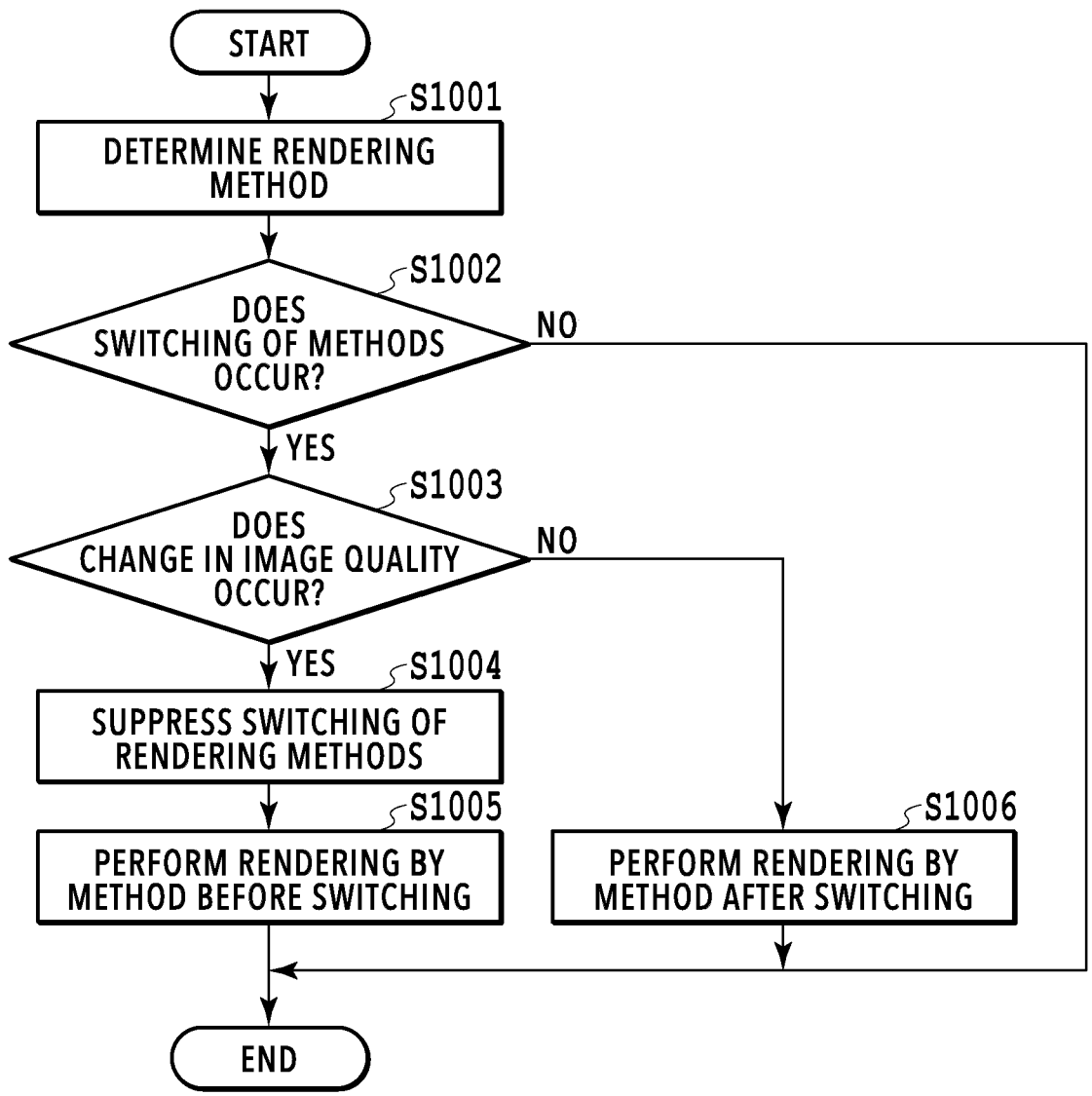
FIG. 3 is a flowchart showing a procedure of processing to suppress a change in image quality that occurs in response to switching of rendering methods.

Next, a procedure of processing to suppress a change in image quality that occurs in response to switching of the rendering methods in the image generation apparatus according to the first embodiment is explained by using a flowchart shown in FIG. 3. First, the rendering method determination unit 106 determines an optimum rendering method based on the image group, the camera parameters, the virtual camera path, and so on received from the pre-stage processing apparatus 12 and the virtual camera path operation apparatus 13 (S1001).

In the present embodiment, it is premised that IBR and NBR are used as the rendering method. For example, in the case where the position of the virtual camera is sufficiently higher than the position of the image capturing camera, IBR is not suitable as the rendering method, and therefore, the rendering method determination unit 106 determines to use MBR. The reason is that in this case, by IBM in which an image is generated by performing perspective transformation for a captured image, an image captured at a low position is transformed into an image as though viewed from a high position by perspective transformation, and therefore, the image is quite different from the image viewed from the actual virtual camera position.

Figure 4A:
FIGS. 4A to 4C are diagrams showing an example of image generation by IBR.
Figure 4B:
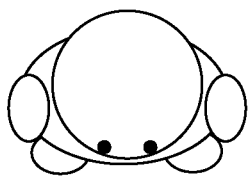
Figure 4C:
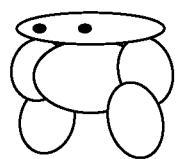

FIG. 4A, FIG. 4B, and FIG. 4C show images to which IBR is not suitable as the rendering method. In FIGS. 4A to 4C, FIG. 4A is an image of a person viewed from the side, FIG. 4B is an image of the person viewed actually from the sky, and FIG. 4C shows an image of the person viewed from the sky, which is generated by using IBR as the rendering method based on the image in FIG. 4A. The image in FIG. 4C generated by using IBR is obtained by performing perspective transformation for the image in FIG. 4A, and therefore, the image is quite different from the image in FIG. 4B viewed actually from the sky, and therefore, a feeling of incongruity occurs as an image.

Further, for example, in the case where a concave object or an object reflecting light is included in a captured image, MBR is not suitable as the determination method of a rendering method, and therefore, the rendering method determination unit 106 determines to use IBR. The reason is that in this case, by MBR in which a three-dimensional model of a foreground object is generated from silhouette images of a plurality of foreground images, generation of a three-dimensional model becomes difficult and the shape of the foreground object is broken.

In addition, in the case where generation of a plurality of free viewpoint images requiring real-time properties is performed at the same time, MBR whose calculation load is heavy is not suitable as the rendering method, and therefore, the rendering method determination unit 106 determines to use IBR whose calculation load is light. As described above, from the viewpoint of the image, the image quality, and the calculation load, an optimum rendering method for generating a free viewpoint image is determined for each frame.

Next, the rendering method determination unit 106 determines whether or not the rendering method determined at S1001 is different from the rendering method in the immediately previous frame, that is, whether or not switching of the rendering methods (generation methods of a virtual viewpoint image) occurs (S1002). Then, in the case where switching of the rendering methods occurs (S1002 Yes), the image quality change determination unit 107 determines whether or not a change in image quality that satisfies a predetermined condition occurs from the image generated in the immediately previous frame (S1003).

Here, the image quality change determination unit 107 determines that a remarkable change in image quality (change in image quality that satisfies a predetermined condition) occurs in the case where the rendering methods are switched on a condition that the distance between the position of the virtual camera and the position of the image capturing camera nearest to the position of the virtual camera is longer than or equal to a threshold value. This point is explained by a comparison between the case where IBR is used as the rendering method and the case where MBR is used as the rendering method.

First, in IBR, the foreground image captured by the camera nearest to the virtual camera is approximated to a view from the position of the virtual camera by performing perspective transformation. Because of this, as the distance between the image capturing camera used for perspective transformation and the virtual camera becomes longer, the difference from the shape of the actual foreground object becomes larger. On the other hand, in MBR, the three-dimensional model is generated from the foreground images captured by a plurality of cameras, and therefore, the shape of the foreground object is not affected by the position of the camera having performed image capturing and the position of the virtual camera. Consequently, it can be said that as the distance between the virtual camera and the image capturing camera becomes longer, a change in image quality becomes larger in the case where the rendering methods (that is, IBR and MBR) are switched.

As a supplement, it is possible to calculate the position information on the image capturing camera from the camera parameters and to acquire the position of the virtual camera from the virtual camera path. Further, in the present embodiment, as described above, as the determination reference of a change in image quality, the distance between the image capturing camera and the virtual camera is used, but it may also be possible to use an image difference value between the rendering results before and after switching of the rendering methods as a determination reference. As the image difference value here, for example, it is possible to use the minimum square error of the color components of all the pixels.

In addition, as the determination reference of a change in image quality, whether or not the moving speed or the zoom speed of the virtual camera is higher than or equal to a threshold value may be used as a determination reference. The reason is that in the case where the moving speed or the zoom speed of the virtual camera is sufficiently high, the visual recognizability of an image is reduced, and therefore, even on a condition that a change in image quality occurs due to a difference in the rendering method, the change is not easily perceived by a user. Further, as the determination reference of a change in image quality, whether or not the size of the foreground image generated by the virtual camera is smaller than or equal to a threshold value may be used as a determination reference. The reason is that in the case where the size of the foreground object is sufficiently small compared to the generated image, the visual recognizability of the foreground object is reduced, and therefore, even on a condition that a change in image quality occurs due to a difference in the rendering method, the change is not easily perceived by a user.

In the case where the image quality change determination unit 107 determines that a remarkable change in image quality (change in image quality that satisfies a predetermined condition) occurs from the immediately previous frame (S1003 Yes), the image quality change suppression unit 108 notifies the rendering method determination unit 106 of the restraint of switching of the rendering methods (S1004).

Here, the contents of the case where switching of the rendering methods (generation methods of a virtual viewpoint image) is restrained are supplemented in more detail, with the relationship with the number of cameras being included. Generally, in switching of the rendering methods, for example, in the case where the number of cameras having captured a foreground object viewed from the virtual camera is large, the rendering method is switched to MBR and in the case where the number is small, the rendering method is switched to IBR. The reason is that in the case where the number of cameras having captured the foreground object is large, it is made possible to generate a highly accurate three-dimensional model by switching the rendering method to MBR, and therefore, it is possible to generate a free viewpoint image of high quality. Further, conversely, in the case where the number of cameras having captured the foreground object is small, on a condition that the rendering method is switched to MBR, it is no longer possible to generate a three-dimensional model of the object and the view of the foreground object is better by IBR in which perspective transformation is performed for an image.

However, in switching of the rendering methods such as this, for example, in the case where the number of cameras having captured the foreground object viewed from the virtual camera decreases, the rendering method is switched from MBR to IBR as described above. However, in the case where the position of the virtual camera is different from the position of the image capturing camera, perspective transformation of an image is used in IBR, and therefore, a difference in image quality becomes clear. Consequently, switching of the rendering methods is restrained until the virtual camera comes close to the position of the image capturing camera and the rendering methods are switched in the case where the virtual camera comes close to the position of the image capturing camera, and thereby, a difference between the actual view and the view by MBR is reduced and then a video image with continuity is generated.

Upon receipt of a notification relating to the restraint of switching of the rendering methods, the rendering method determination unit 106 notifies the rendering processing unit 105 to generate an image by the same rendering method as that of the immediately previous frame without switching the rendering methods (S1005). Further, in the case where it is determined that there is no change in image quality from the immediately previous frame at S1003, the rendering method is switched to the rendering method determined to be optimum by the rendering method determination unit 106 and the rendering processing is performed (S1006).

By performing processing as described above, in the case where it is determined that a remarkable change in image quality occurs in switching of the rendering methods at the time of generating a free viewpoint image, by limiting switching of the rendering methods, it is possible to suppress a visual feeling of incongruity.

In the present embodiment, in the case where a change in image quality becomes remarkable, switching of the rendering methods is restrained, but it may also be possible to relax the threshold value in accordance with an elapse of time in order to avoid continuation of the rendering method that is not optimum. Further, in the present embodiment, explanation is given by premising IBR and MBR as the rendering method, but the rendering method is not necessarily limited to those. Consequently, it may also be possible to make the present embodiment compatible with, for example, switching between IBRs, switching between IBRs, and switching with a hybrid rendering method integrating IBR and MRB.

In addition, in the present embodiment, unless particularly stated, it is assumed that the word "image" includes both concepts of a moving image and a still image. That is, it is possible for the image generation apparatus 10 according to the present embodiment to take both or one of a still image and a moving image as a processing target. In addition, in the present embodiment, explanation is given by focusing attention on a difference in the shape of a foreground object between the image generated by IBR and the image generated by MBR, but the target is not necessarily limited to the shape of a foreground object. Consequently, it is possible to suppress a change due to switching of the rendering methods by similarly performing processing for the color, lightness, and resolution of images generated by IBR and MBR.

Second Embodiment

In a second embodiment, by combining rendering results (images) before and after switching of the rendering methods, a remarkable change in image quality is suppressed.
(Function Block Diagram)

Figure 5:
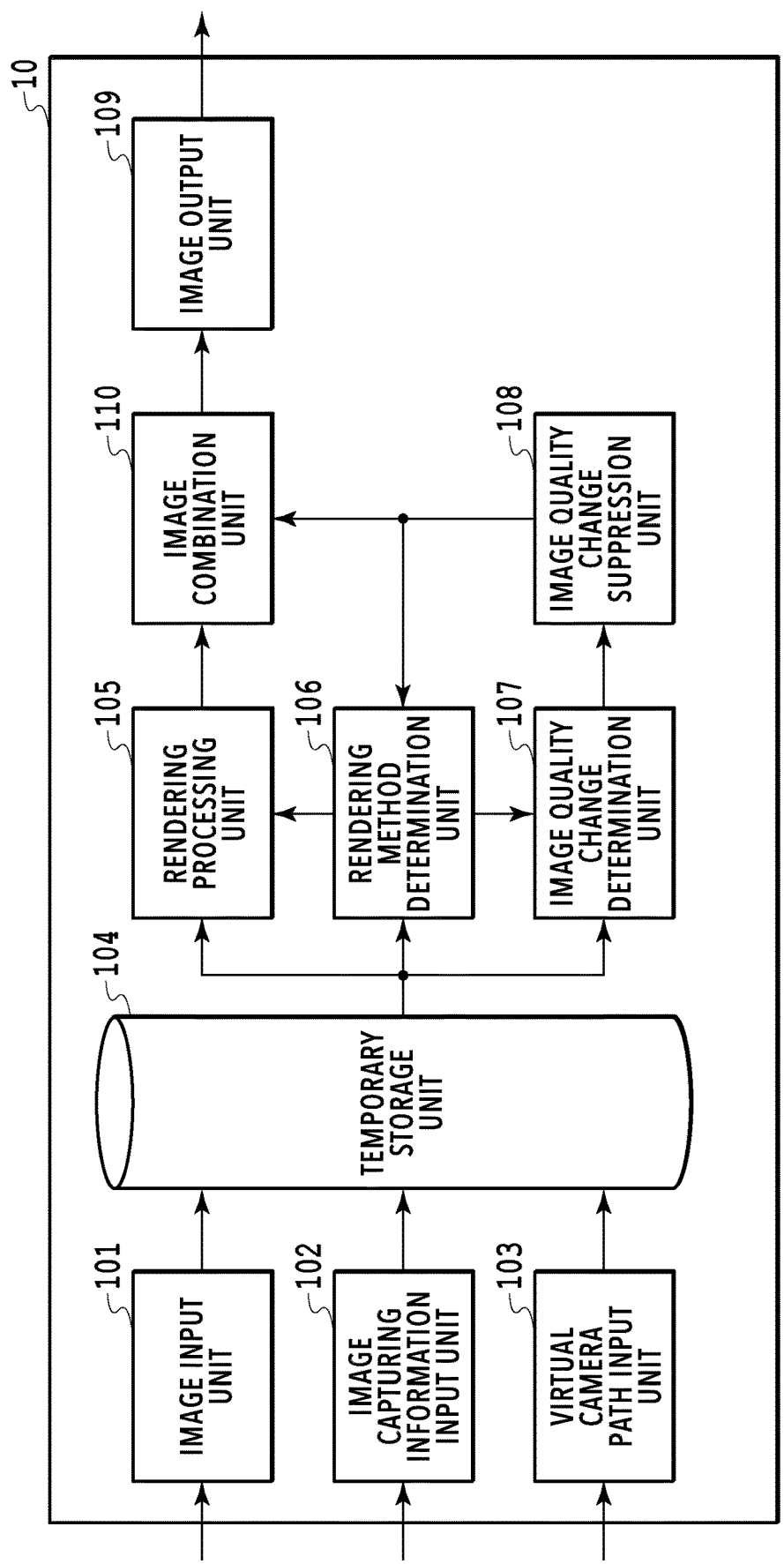
FIG. 5 is a function block diagram showing a function configuration of an image generation apparatus according to a second embodiment.

FIG. 5 is a function block diagram showing a function configuration of an image generation apparatus according to the second embodiment. In the following, a function block different from the first embodiment is explained.

The image quality change suppression unit 108 notifies an image combination unit 110 to combine images generated by the rendering methods before and after switching in the case where a change of the rendering method occurs in the rendering method determination unit 106. Further, the image quality change suppression unit 108 notifies the rendering method determination unit 106 to perform rendering by both the methods before and after switching.

The image combination unit 110 combines the images generated by the rendering methods before and after switching, which are output from the rendering processing unit 105, by morphing. Here, morphing is processing to supplement an intermediate portion between frames in order to represent the way a shape is gradually changed into another shape by a video image and in the present embodiment, the intermediate portion is drawn by extracting a plurality of corresponding points between the immediately previous frame and the current frame and estimating intermediate points.

The corresponding points between frames are extracted by estimating the foreground object that is the same in each frame from the image features, such as the shape and color, and further by calculating corresponding points set in advance from the foreground object, for example, such as the head and the leg, from the foreground of each frame. Further, in the present embodiment, as the combination method of images, morphing is used, but the combination method of images is not necessarily limited to this and for example, it is also possible to use an image combination method, for example, such as alpha blend.
(Processing Flow)

Figure 6:
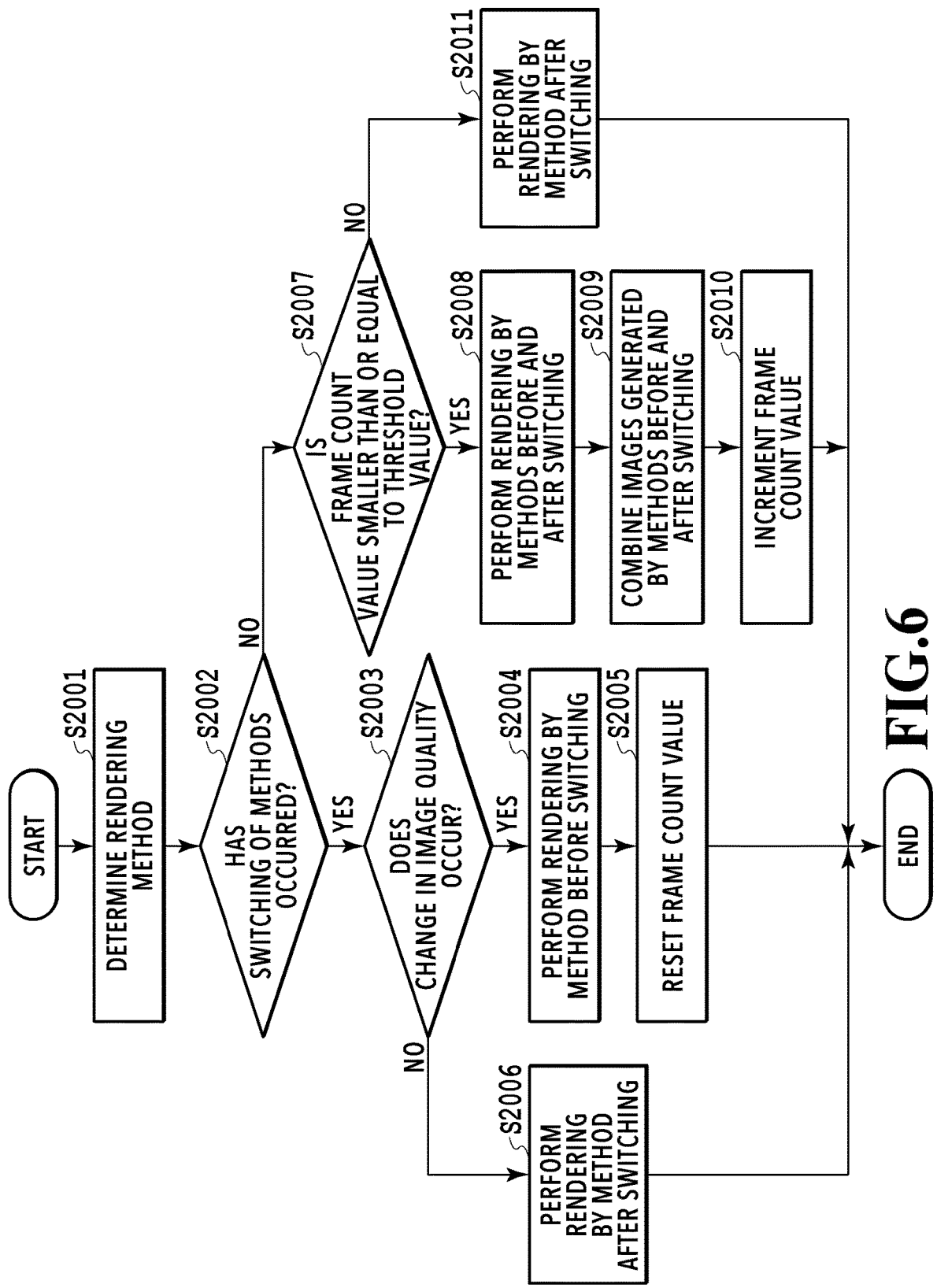
FIG. 6 is a flowchart showing a procedure of processing to suppress a change in image quality by combining rendering results before and after switching of rendering methods.

Next, the procedure of processing to suppress a change in image quality by combining rendering results (images) before and after switching of the rendering methods in the image generation apparatus according to the second embodiment is explained by using a flowchart shown in FIG. 6.

First, the rendering method determination unit 106 determines an optimum rendering method (S2001) as in the first embodiment, determines whether or not switching of the rendering methods has occurred from the immediately previous frame, and notifies the image quality change suppression unit 108 of the determination results (S2002).

In the case where the determination results indicate that switching of the rendering methods has occurred (S2002 Yes), the image quality change determination unit 107 determines whether or not a remarkable change in image quality occurs from the image generated in the immediately previous frame (S2003). Then, in the case where it is determined that a remarkable change in image quality occurs, the image quality change suppression unit 108 notifies the rendering method determination unit 106 to perform rendering by the method before switching (S2004). Next, the image quality change suppression unit 108 resets and holds the frame count value counting the number of frames necessary until completion of switching of the rendering methods (S2005). In the case where it is determined that a remarkable change in image quality does not occur at S2003 the image quality change suppression unit 108 notifies the rendering method determination unit 106 to perform rendering by the method after switching (S2006).

Further, in the case where it is determined that switching of the rendering methods has not occurred at step S2002 (S2002 No), the image quality change suppression unit 108 determines whether the frame count value is smaller than or equal to a threshold value (S2007). Here, the frame count value is the value counting the number of frames as described previously and the threshold value of the frame count value is defined as the number of frames necessary for combining the rendering results before and after switching of the rendering methods. Consequently, for example, in the case where the threshold value of the frame count value is set to "100", this means that the image quality at the time of switching of the rendering methods is changed gradually through 100 frames. The frame count value may be a fixed value set in advance or may be set dynamically based on the magnitude of a change in image quality before and after switching of the rendering methods.

In the case where it is determined that the frame count value is smaller than or equal to the threshold value at S2007 (S2007 Yes), the image quality change suppression unit 108 notifies the rendering method determination unit 106 to perform the rendering processing by the methods before and after switching (S2008). The image combination unit 110 combines (performs morphing of) the generated images for which rendering has been performed by the rendering methods before and after switching in the rendering processing unit 105 (S2009). Here, the image quality change suppression unit 108 may adjust the combination ratio of the images before and after switching in accordance with the frame count value, such as enhancing the image component before switching in the case where the frame count value is small and enhancing the image component after switching in the case where the frame count value is large. After combining the images (S2009), the image quality change suppression unit 108 increments the frame count value (S2010).

Further, in the case where it is determined that the frame count value is larger than the threshold value at step S2007, the image quality change suppression unit 108 notifies the rendering method determination unit 106 to generate the image by performing rendering by the rendering method after switching (S2011).

As described above, by the processing shown in FIG. 6, it is possible to suppress a visual feeling of incongruity by combining the images generated before and after switching in the case where it is determined that a remarkable change in image quality occurs in switching of the rendering methods in generation of a free viewpoint image.

Third Embodiment

In a third embodiment, in the case where a change in image quality accompanying switching of the rendering methods is large, the remarkable change in image quality is suppressed by controlling the virtual camera path in order to suppress the change in image quality.

(Image Generation Apparatus Block)

Figure 7:
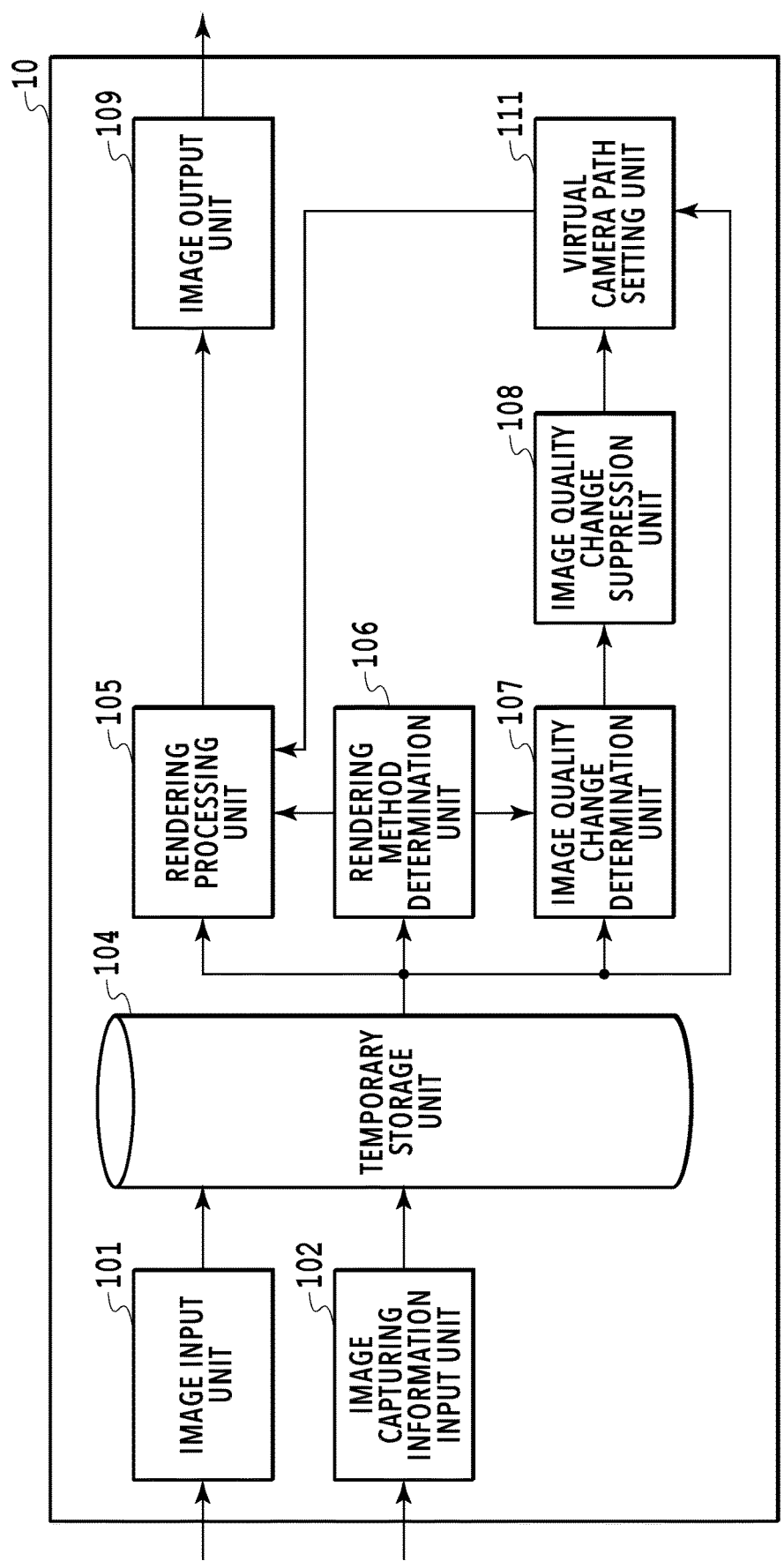
FIG. 7 is a function block diagram showing a function configuration of an image generation apparatus according to a third embodiment.

FIG. 7 is a function block diagram showing a configuration of an image generation apparatus according to the third embodiment. In the following, only a function block different from the first embodiment is explained.

The image quality change suppression unit 108 notifies a virtual camera path setting unit 111 to suppress a change in image quality by controlling the virtual camera path in the case where the image quality change determination unit 107 determines that there is a change in image quality accompanying switching of the rendering methods.

The virtual camera path setting unit 111 calculates an optimum virtual camera path from an input image group, image capturing information, and so on at the normal time. Here, as a virtual camera path to be calculated, for example, following a specific player, zoom of the virtual camera of an area of interest by detecting a highlight scene, and so on are supposed. In the case of being notified to suppress a change in image quality by controlling the virtual camera path by the image quality change suppression unit 108, the virtual camera path setting unit 111 prevents a change in image quality from being perceived by reducing the visual recognizability of a user by setting the moving speed of the virtual camera to a speed higher than or equal to the threshold value.

(Processing Flow)

Figure 8:
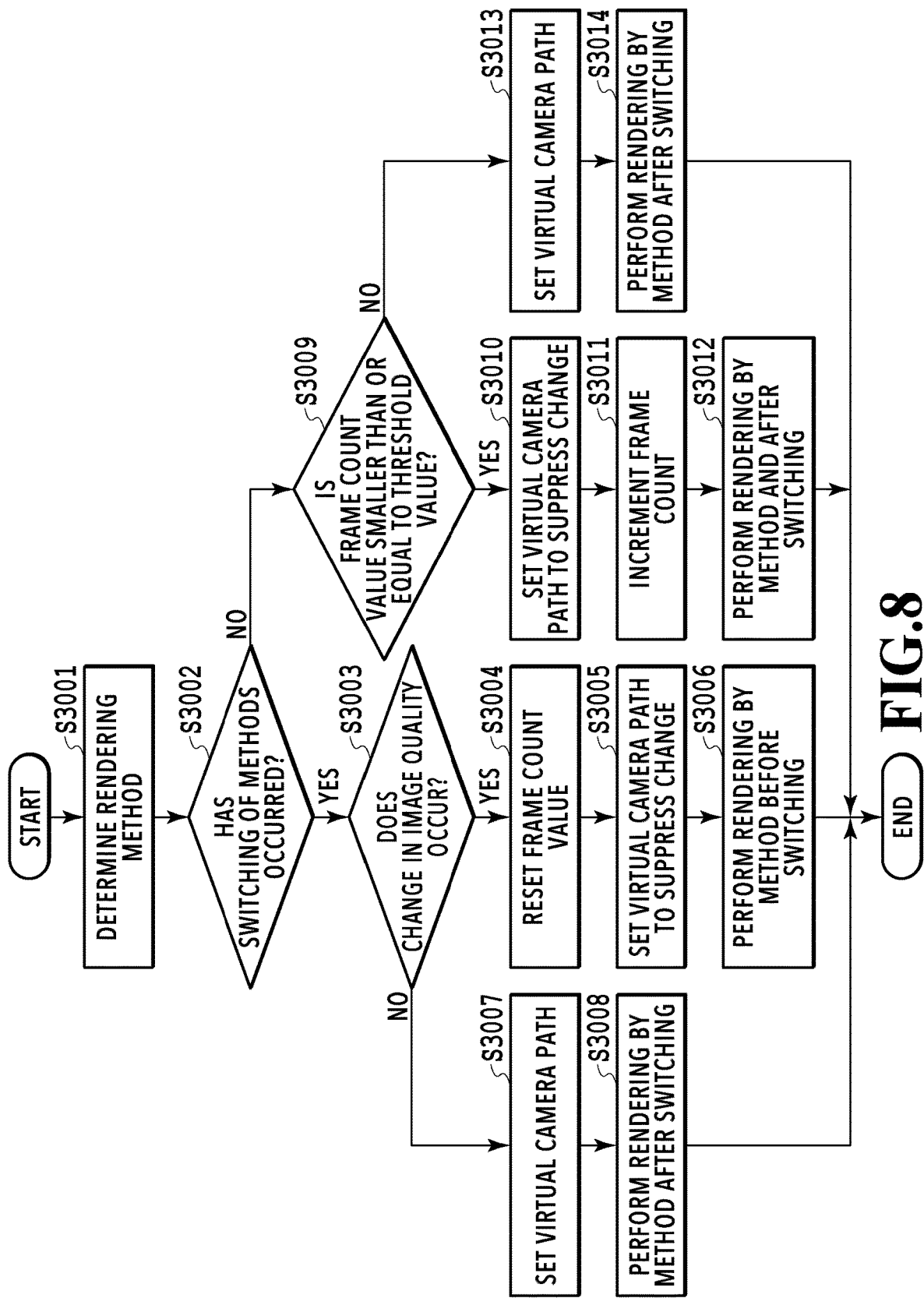
FIG. 8 is a flowchart showing a procedure of processing to suppress a change in image quality that occurs in response to switching of rendering methods.

Next, a procedure of processing to suppress a change in image quality that occurs in response to switching of the rendering methods in the image generation apparatus according to the third embodiment is explained by using a flowchart shown in FIG. 8. The rendering method determination unit 106 determines an optimum rendering method (S3001) as in the first embodiment and determines whether or not switching of the rendering methods has occurred from the immediately previous frame (S3002).

In the case where switching of the rendering methods has occurred at step 3002, the image quality change determination unit 107 determines whether or not a remarkable change in image quality occurs before and after switching of the rendering methods and notifies the image quality change suppression unit 108 of the determination results (S3003). The determination of where or not a remarkable change in image quality occurs is the same as that of the first embodiment, and therefore, explanation is omitted here.

In the case where it is determined that there is a remarkable change in image quality at S3003, the image quality change suppression unit 108 resets the frame count value indicating the number of frames necessary until completion of switching of the rendering methods (S3004).

The image quality change suppression unit 108 notifies the virtual camera path setting unit 111 to control a change in image quality and the virtual camera path setting unit 111 sets a virtual camera path to suppress a perceptive change in image quality (S3005). Here, as a virtual camera path to suppress a perceptive change in image quality, the moving speed of the virtual camera is set to a speed larger than or equal to a threshold value.

The reason is that by increasing the moving speed of the virtual camera, the visual recognizability in the foreground object of a user is reduced and thereby a change in shape of the foreground object is prevented from being perceived by the user. In the present embodiment, as the setting method of the virtual camera path to suppress a perceptive change in image quality, the moving speed of the virtual camera is increased, but the setting method of the virtual camera path to suppress a perceptive change in image quality is not necessarily limited to this. Consequently, for example, it is possible to set, such as increasing the zoom speed of the virtual camera, zoom out (zoom value) of the virtual camera, and causing the position of the virtual camera to coincide with the position of the image capturing camera (real camera).

As a supplement, increasing the zoom speed of the virtual camera and zoom out of the virtual camera are for preventing a change in image quality from being perceived by a user by reducing the visual recognizability of the foreground object of the user. Further, moving the virtual camera to the position of the real camera is because a difference in rendering results is small between IBR and MBR at the position near to the image capturing camera.

After notifying the virtual camera path setting unit 111 to prevent a change in image quality from being perceived (S3005), the image quality change suppression unit 108 notifies the rendering method determination unit 106 to perform rendering by the rendering method before switching (S3006). The reason is to prevent switching from being performed in the frame in which switching of the rendering methods is determined because the virtual camera path is changed across a plurality of frames.

Further, in the case where it is determined that there is no remarkable change in image quality at S3003, the virtual camera path setting unit 111 sets the virtual camera path from the input image and the camera parameters upon being notified that suppression of a change in image quality is not necessary (S3007). Then, in the case where the virtual camera path is output to the rendering processing unit 105, the rendering processing unit 105 performs rendering by the method after switching (S3008).

Further, in the case where it is determined that there is no switching of the rendering methods at S3002, the image quality change suppression unit 108 determines whether or not the frame count value is smaller than or equal to a threshold value (S3009). This threshold value is set as the period of time during which a change in image quality accompanying switching of the rendering methods is restrained. The image quality change suppression unit 108 notifies the virtual camera path setting unit 111 to suppress a change in image quality and the virtual camera path setting unit 111 sets the virtual camera path to suppress a change in image quality (S3010).

After setting the virtual camera path, the image quality change suppression unit 108 increments the frame count value (S3011). The virtual camera path setting unit 111 outputs the virtual camera path to suppress a change in image quality to the rendering processing unit 105 and the rendering processing unit 105 performs rendering by the rendering method after switching (S3012).

Further, in the case where the frame count value is larger than the threshold value at S3009 (S3009 No), the virtual camera path setting unit 111 sets a virtual camera path that does not need to suppress a change in image quality and outputs to the rendering processing unit 105 (S3013). As the generation method of a virtual camera path not accompanied by suppression of a change in image quality, determining and following a specific player, performing zoom by determining a highlight scene, and so on are supposed. Then, the rendering processing unit 105 performs rendering by the input rendering method and the virtual camera path and outputs the image (S3014).

By the above processing, it is possible to suppress a visual feeling of incongruity by setting a virtual camera path that makes it difficult for a change in image quality to be perceived in the case where it is determined that a remarkable change in image quality occurs in switching of the rendering methods in generation of a free viewpoint image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce a visual feeling of incongruity by suppressing a change in image quality accompanying switching of the rendering method in generation of the virtual viewpoint image and ensuring the continuity of the video image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-115933 filed Jun. 13, 2017, which is hereby incorporated by reference wherein in its entirety.

What is claimed is:

1. A generation apparatus comprising:
one or more memories configured to store instructions; and
one or more processors communicatively connected to the one or more memories and configured to execute the instructions to function as:
a generation unit configured to generate, based on a plurality of captured images obtained by a plurality of image capturing apparatuses and virtual viewpoint information, a virtual viewpoint image by a generation method determined from a plurality of generation methods for generating the virtual viewpoint image:
a changing unit configured to change the generation method to be used by the generation unit for generating the virtual viewpoint image from a first generation method to a second generation method; and
a control unit configured to determine whether to perform control to restrain the change of the generation method by the changing unit, depending on evaluation information relating to a degree of a change, in the virtual viewpoint image, caused as a result from the change of the generation method of the virtual viewpoint image from the first generation method to the second generation method.

2. The generation apparatus according to claim 1, wherein the first generation method is a model-based generation method for generating the virtual viewpoint image by using a shape model generated based on an object detected from the plurality of captured images, and the second generation method is an image-based generation method for generating the virtual viewpoint image by performing transformation processing for one or more captured images selected from the plurality of captured images based on the virtual viewpoint information.

3. The generation apparatus according to claim 1, wherein the first generation method is an image-based generation method for generating the virtual viewpoint image by performing transformation processing for one or more captured images selected from the plurality of captured images based on the virtual viewpoint information, and the second generation method is a model-based generation method for generating the virtual viewpoint image by using a shape model generated based on an object detected from the plurality of captured images.

4. The generation apparatus according to claim 1, wherein the control unit is further configured to determine whether to restrain the change from the first generation method to the second generation method by using evaluation information relating to a change in image quality in a case where the generation method of the virtual viewpoint image is changed from the first generation method to the second generation method.

5. The generation apparatus according to claim 4, wherein the control unit is further configured to restrain the change from the first generation method to the second generation method in a case where a change in image quality on a condition that the generation method of the virtual viewpoint image is changed from the first generation method to the second generation method is larger than or equal to a threshold value.

6. The generation apparatus according to claim 5, wherein the control unit is further configured to determine whether or not the change in image quality is larger than or equal to a predetermined threshold value based on a distance between a position of a virtual camera and a position of an image capturing camera nearest to the position of the virtual camera.

7. The generation apparatus according to claim 1, wherein the control unit is further configured to determine whether or not to restrain the change from the first generation method to the second generation method by using evaluation information relating to a moving speed of a virtual viewpoint represented by the virtual viewpoint information.

8. The generation apparatus according to claim 1, wherein the control unit is further configured to determine whether to restrain the change from the first generation method to the second generation method by using evaluation information relating to a change speed of a zoom parameter of a virtual viewpoint represented by the virtual viewpoint information.

9. The generation apparatus according to claim 1, wherein the control unit is further configured to determine whether to restrain the change from the first generation method to the second generation method by using evaluation information relating to a relationship between a position of a virtual viewpoint represented by the virtual viewpoint information and a position of at least one the plurality of cameras.

10. The generation apparatus according to claim 1, wherein
the control unit is further configured to determine whether to restrain the change from the first generation method to the second generation method by using evaluation information relating to a size of a foreground object in the virtual viewpoint image.

11. The generation apparatus according to claim 1, wherein
the control unit is further configured to determine whether to restrain the change from the first generation method to the second generation method by using two or more pieces of:
(1) evaluation information relating to a change in image quality by changing the generation method of the virtual viewpoint image from the first generation method to the second generation method;
(2) evaluation information relating to a moving speed of a virtual viewpoint represented by the virtual viewpoint information;
(3) evaluation information relating to a change speed of a zoom parameter of a virtual viewpoint represented by the virtual viewpoint information;
(4) evaluation information relating to a relationship between a position of a virtual viewpoint represented by the virtual viewpoint information and a position of at least one of the plurality of cameras; and
(5) evaluation information relating to a size of a foreground object in the virtual viewpoint image.

12. The generation apparatus according to claim 1, wherein
the control unit is further configured to restrain a change of the generation method by generating a third virtual viewpoint image combining a first virtual viewpoint image generated by the first generation method and a second virtual viewpoint image generated by the second generation method as a virtual viewpoint image to be displayed during a period of time of transition from the first generation method to the second generation method.

13. The generation apparatus according to claim 1, wherein
the control unit is further configured to change the virtual viewpoint information so that a change in image quality caused by a change of the generation method of the virtual viewpoint image becomes small.

14. The generation apparatus according to claim 12, wherein
the control unit is further configured to change the virtual viewpoint information so that a moving speed of a virtual viewpoint represented by the virtual viewpoint information becomes higher than a moving speed set in advance.

15. The generation apparatus according to claim 12, wherein
the control unit is further configured to change the virtual viewpoint information so that a zoom magnification of a virtual viewpoint represented by the virtual viewpoint information becomes lower than a zoom magnification set in advance.

16. A control method comprising:
determining a generation method for generating, based on a plurality of captured images obtained by a plurality of image capturing apparatuses and virtual viewpoint information, a virtual viewpoint image from a plurality of generation methods;
performing control to change the generation method for generating the virtual viewpoint image from a first generation method to a second generation method; and
determining whether to perform control to restrain the change of the generation method depending on evaluation information relating to a degree of a change, in the virtual viewpoint image, caused as a result from the change of the generation method of the virtual viewpoint image from the first generation method to the second generation method.

17. A non-transitory computer readable storage medium storing a program for causing a computer to perform a control method comprising:
determining a generation method for generating, based on a plurality of captured images obtained by a plurality of image capturing apparatuses and virtual viewpoint information, a virtual viewpoint image from a plurality of generation methods;
performing control to change the generation method for generating the virtual viewpoint image from a first generation method to a second generation method; and
determining whether to perform control to restrain the change of the generation method depending on evaluation information relating to a degree of a change, in the virtual viewpoint image, caused as a result from the change of the generation method of the virtual viewpoint image from the first generation method to the second generation method.

* * * * *